United States Patent Office 3,833,746
Patented Sept. 3, 1974

3,833,746
PROCESS FOR TANNING EDIBLE
COLLAGEN CASING
Mauj A. Cohly, Danville, Ill., assignor to
Tee-Pak, Inc., Chicago, Ill.
No Drawing. Filed Jan. 8, 1973, Ser. No. 321,617
Int. Cl. A22c 13/00
U.S. Cl. 426—277                    7 Claims

ABSTRACT OF THE DISCLOSURE

An improved process for tanning an edible collagen meat casing comprises immersing a coagulated and washed collagen casing, substantially free of ammonium salts, in a first bath substantially saturated with an alkali metal salt of a strong acid, acidified to a pH less than about 3, containing an effective amount of an edible, non-toxic aldehyde, and then fixing the aldehyde in the casing on withdrawal of the casing from the first bath by immersing the casing in a second bath substantially saturated with an alkali metal salt of a strong acid and made alkaline to a pH of about 12 or higher.

FIELD OF THE INVENTION

This invention relates to a new and useful improvement in a method for preparing artificial sausage casings and particularly to the production of artificial sausage casings derived from animal hide collagen. Collagen casings have been widely accepted for pork sausages as these casings have satisfactory strength during stuffing, linking, and cooking of said sausages and further are edible with the cooked sausages.

In the preparation of edible collagen casings, hide collagen derived from animal hides is converted into a finely divided fibrillar form and extruded in the form of a dilute collagen slurry. Usually, the extruded collagen is passed into a sodium sulfate or ammonium sulfate coagulating bath which dehydrates the collagen slurry and forms a coherent collagen film. At this stage in the processing, the salt coagulated collagen film can be handled. However, removal of the ammonium sulfate or other coagulating salt from the film by washing with subsequent wash waters will cause the collagen film to revert to a paste or slurry.

It is therefore necessary to harden or tan the extruded collagen film to permit further processing of the film through the steps of washing, drying, shirring, stuffing, etc. It is preferred that the tanning or hardening process utilize a tanning agent which acts rapidly, is completely non-toxic in the form in which it is present in the finished casing, and yet produce a casing of such sufficient strength to be stuffed with sausage meat, linked, packaged, and cooked but tender enough to eat without being chewy.

In the past, the collagen casing has been extruded through an annular die into a bath containing ammonium and/or sodium sulfate. The pH is usually about 8 and is obtained by adding a small amount of caustic to the ammonium or sodium sulfate solution. Tanning of the collagen casing can be accomplished substantially simultaneously in the coagulating tank but is usually accomplished subsequent to coagulation in a separate bath.

While the leather art discloses literally thousands of tanning agents, some of which are known from antiquity, the ones which can be used for tanning or hardening edible collagen casings are very few. Most of the common leather tanning agents are highly toxic. Many of the ones which are non-toxic are difficult to apply under the process conditions for edible collagen casings. Others which are non-toxic and easy to apply have the disadvantage of imparting an undesirable color to the treated casing.

One of the most successful methods of tanning or hardening collagen casings utilizes a treating bath of a citrato complex of a partially basic aluminum salt. However, aluminum tanned casings are somewhat stiff and difficult to link after stuffing. Such casings also tend to split during frying.

The tanning or hardening of collagen casings with aldehydes, such as formaldehyde, glutaraldehyde, glyoxal, etc., is also well known in the art. Formaldehyde treatment must be very carefully controlled to avoid the presence of any of the highly toxic aldehyde in the free state in the finished product. Glutaraldehyde has also been used as a tanning or hardening agent for collagen casings. Aldehydes, in general, and glutaraldehyde in particular, have the disadvantage of forming undesirable polymers, especially colored polymers, under conditions which are conducive to reaction with the collagen. Cohly, et al., U.S. Pat. 3,533,809 discloses a process for tanning with glutaraldehyde buffered with an alkali metal acid phosphate which avoids the formation of colored aldehyde polymers in the treated product.

SUMMARY OF THE INVENTION

Edible collagen casings are tanned or hardened with aldehydes in a two-step treatment in which there is essentially no toxic aldehyde residue in the product and no formation of undesirable aldehyde polymers. A coagulated gel collagen casing, free of ammonium salts, is passed into a first bath consisting essentially of a substantially saturated solution of an alkali metal salt of a strong acid, acidified to a pH of about 3 or less, and containing a sufficient amount, e.g., 0.01–5.0%, of an aldehyde, such as formaldehyde, glutaraldehyde, glyoxal, etc., to tan or harden the casings.

The treated casing is then passed into a fixing bath consisting essentially of a substantially saturated solution of an alkali metal salt of a strong acid, made alkaline to a pH of at least 12.0 with a strong alkali. After washing, plasticizing, and drying, the treated casing is easy to shirr, stuff, and cook; and is free of aldehyde polymers.

DESCRIPTION OF THE PREFERRED EMBODIMENT

The two-step tanning process of this invention is applicable to the tanning of extruded gel collagen casing prepared from either lime or unlimed animal hides. If a limed hide is used as the source of collagen for the preparation of an edible casing, it is preferred that the procedure described in the U.S. Pat. 3,408,918 be followed or that the hide be limed for a short period of time for converting the hide into an extrudable collagen slurry and carried out within a period of about 36 hours or less, as in U.S. Pat. 3,425,846.

If an unlimed collagen is to be used in the preparation of edible collagen casing, the unlimed hide, either fresh or frozen, first is defleshed and the hair and epidermal layer removed. Usually this is accomplished by mechanical means, e.g., by abrading, scraping, or splitting. Then the hide is cut into small pieces, passed through a meat grinder until it is reduced to a small size, and the ground collagen swollen in a solution of organic acid such as lactic or citric to produce a slurry having from about 3–6% collagen.

In the manufacture of tubular casing from a collagen source, the collagen slurry is extruded through an annular die into a coagulating bath. The bath usually comprises a concentrated solution of sodium or ammonium sulfate. Ordinarily, ammonium sulfate is the preferred salt used for coagulation as it is more soluble than sodium sulfate. It is common practice to maintain the pH of the coagulating bath at about 7–8.5 wherein ammonium sulfate or sodium sulfate is used as the coagulating salts.

Limed animal hides, if used as a source of collagen material, first are treated to remove any blood and then are treated with a lime-containing solution for a time, e.g., 3–12 hours, sufficient to at least partially dehair the hide. The hide then is neutralized by treatment with a non-toxic acid reducing the pH to about 2–6.5, forming soluble calcium salts. The neutralized hide then is washed sufficiently to remove most of the water-soluble salts and remove any hair on the surface of the hide. Like the procedure with the unlimed hides, the hide then is subjected to grinding in a meat grinder to reduce the size to small particles and swollen by immersing the fine particles in a solution of organic acid. The acid typically is a weak organic acid such as lactic or citric. The resulting slurry generally has a collagen content of from about 3–6% by weight. The slurry then is extruded through a die into a coagulation bath comprising a saturated solution of ammonium sulfate or the like.

After coagulation, the gel collagen casing is given an initial washing in a more dilute salt solution to remove soluble salts, particularly ammonium salts, from the casing. The washing of the casing at this point, however, must not remove so much of the coagulating salt as to revert the collagen to a gel having a low strength, e.g., 100–200 g.

After the gel casing is washed and is substantially free of ammonium salts, it is then passed into a bath maintained at a pH not exceeding about 3 which is substantially saturated with an alkali metal salt of a strong acid, and contains about 0.01–5.0% of an aldehyde capable of tanning the collagen casing, which aldehyde is present in an edible or non-toxic form in the finished product. During this initial stage, salt and the edible, non-toxic aldehyde are absorbed into the casing in an amount sufficient to tan the casing with a residue of no more than 10 p.p.m. free aldehyde. The strength of the casing is maintained because the salt present in the bath is absorbed by the casing. It is important that the pH of the solution be maintained below about 3 so as to keep the edible aldehyde in its monomeric state and to prevent fixing of the tanning agent in the casing. Otherwise, the aldehyde would not be absorbed by the casing.

Alkali metal salts of strong acids are the sodium and potassium salts of strong mineral acids, e.g., phosphoric, sulfuric, nitric, and hydrochloric. A substantially saturated solution of the alkali metal salt is at least 80% saturated at the process temperature.

In the first step of the process for tanning the gel casing, the pH of the first bath must be maintained at a pH of about 3 or less. A pH of 3 or less usually insures that there is substantially no polymerization of the aldehyde in the bath and the aldehyde remains in its monomeric form for more complete absorption into the casing.

The gel casing is then immersed in a second bath which fixes the aldehyde into the casing. When the treated casing is subsequently washed to remove soluble salts, the wet strength will not decrease substantially below about 1500 g./in.². This strength provides for satisfactory processing at desirable speeds through the remaining operations and particularly through the dryer. The second bath is maintained at a pH of 12 or higher with strong alkali and substantially saturated with an alkali metal salt of a strong acid as used in the first tank. A pH of about 12 or higher is necessary to effect sufficient crosslinking to provide adequate strength. As is known, the aldehyde reacts with the active hydrogens on the amino portion of the collagen molecule and forms a link between the nitrogen and carbon atom. Formaldehyde on reaction with the collagan molecule, forms a bridge between two nitrogen atoms, with the bridge being a methylene radical. When the pH falls substantially below about 12, the aldehyde does not react in desirable manner to fix the aldehyde in the casing and strengthen the casing.

The aldehydes which can be used in practicing this invention are those normally used for the tanning of collagen casings. The aldehydes preferably are those which are non-toxic in the finished casings. Examples of preferred aldehydes are formaldehyde, glyoxal, and glutaraldehyde. Of these, glutaraldehyde is the preferred aldehyde.

The first and second baths for effecting absorption of the salt and aldehyde and for fixing the aldehyde should be maintained at temperatures from about 5°–40° C. Preferred bath temperatures for the absorption and fixing steps of the process are between about 20–30° C.

Immersion times in the first bath are for a time sufficient to effect absorption of a sufficient amount of the salt and of the aldehyde to harden and maintain the strength of the casing. This is achieved in a period of time from about 2–10 minutes. Immersion of the treated casing in the fixing bath is for a period of time to effect substantial cross-linking of the absorbed aldehyde into the casing. Usually, the period of time for effecting cross-linking is from about 2–10 minutes.

In the general process description given above, the gel casing is coagulated in ammonium sulfate which is washed out of the casing before the casing is immersed in the first treating bath. If the coagulation bath is a solution of a salt other than an ammonium salt, e.g., sodium sulfate, sodium acid phosphate, etc., the intermediate wash steps may be eliminated. Also, the treatment in the first and second baths may be used as a supplemental tanning step following a conventional aluminum or iron salt tanning. Typically the aluminum or iron salt is rendered partially basic with sodium hydroxide and chelated with an organic acid.

The following examples are provided to illustrate preferred embodiment of the invention and are not intended to restrict the scope thereof. All parts are parts by weight and all percentages are expressed as weight percentages.

EXAMPLE I

A typical prior art preparation of edible collagen casings from unlimed animal (e.g., bovine) hides is illustrated.

The hide is defleshed and split or mechanically abraded to remove the hair and epidermal layer at a temperature of from about 0–5° C. The hide splits then are cut into small square or rectangular sections, e.g., one-fourth to four inches on the side, in preparation for grinding.

The small pieces of treated hides are converted to a fine pulp by successive passes through a meat grinder. In this grinding operation, sufficient ice is mixed with the hide splits to maintain the temperature below about 20° C. Sucessive passes through the meat grinder using successively smaller dies, the smallest being about 3/64 of an inch are made. At this point, sufficient water is added to the pulp to produce a mixture consisting by weight of about 90% water and 10% collagen.

The collagen pulp then is treated with sufficient dilute lactic acid to produce a pH from about 2.5–3.7. After a thorough mixing, the pulp and acid are stored overnight at a temperature of about 3° C. to permit swelling. At the end of this period of time, the collagen is swollen and has taken up all of the water in the slurry. The swollen collagen then is mixed with additional water and acid to produce a thin, homogeneous paste consisting of about 4% collagen and 1.2% lactic acid by weight (maintaining a pH of from about 2.5-3.7). This paste is then homogenized, filtered to remove any solid contaminants, and deaerated.

The slurry then is pumped under pressure through an annular rotating extrusion die into a coagulating bath consisting of about 42% ammonium sulfate (sodium sulfate can also be used) in water to produce a gel collagen casing. When collagen is extruded as a thinwalled tube into this concentration solution of ammonium sulfate, the collagen fibrils are dehydrated and collapsed to form a coherent film. During coagulation, the bath is circulated, both inside and outside the tube, to maintain the tube in an inflated condition and to insure proper coagulation of the casing both on the inside and outside.

After the film is coagulated in the ammonium sulfate solution, it is necessary to tan the film to give the film sufficient strength for further processing. If the casing taken from the ammonium sulfate coagulating bath is dried without further treatment, a film would be produced which has moderate strength in the dry state but would revert to a paste upon contact with water. It is therefore necessary for the casing to be tanned or hardened to provide the wet and dry strength in the finished product required in an edible casing.

The coagulated casing, having a wet breakload strength from about 1200–1400 g., is continuously passed into a first tanning bath for 2½ minutes. The tanning bath contains 8% aluminum sulfate, rendered ⅔ basic with sodium hydroxide, and complexed with ⅓ mole citric acid, plus 20% ammonium sulfate. The bath has a pH of 4.0–5.0. The tanned casing has a tensile strength of 1200–1400 g./in.$^2$.

The tanned casing then is washed with water for about one minute and then passed into a second tanning bath having the same composition as the first except that the ammonium sulfate content is only 4%. The wet tensile strength of the casing on removal from this bath is about 1200–1400 g./in.$^2$. The tanned casing then is washed with copious amounts of water for 2½ minutes to remove substantially all of the excess ammonium sulfate and unreacted aluminum sulfate. The tensile strength of the washed casing is about 1000–1200 g./in.$^2$.

Further tanning of the casing is effected by passing the casing into an aqueous bath containing about 0.1% of glutaraldehyde at a pH of about 7 or slightly less. The residence time of the casing in such bath is about 2½ minutes. The casing then is washed with tap water for about 2½ minutes. The tensile strength of the washed casing is about 1000–1200 g./in.$^2$.

Thereafter, the casing is plasticized by passing it through an aqueous solution of 3.2% glycerin and 0.3% sodium bicarbonate for 2½ minutes. The wet strength of the plasticized casing is about 650–900 g./in.$^2$. Finally, the casing is dried and then shirred in preparation for use by the meat packer.

EXAMPLE II

The preparation of edible collagen casings from unlimed animal hides and tanned in accordance with this invention is illustrated.

A collagen slurry is prepared, extruded, and tanned in successive aluminum sulfate baths as in Example I. The subsequent tanning with aldehyde is in accordance with this invention.

The aluminum sulfate tanned casing, having a wet breakload strength of 1200–1400 g./in.$^2$ is passed into an aqueous bath substantially saturated with sodium chloride at 25° C. and containing 0.1% glutaraldehyde plus 1% hydrochloric acid. The pH of this bath is 1.0 or slightly less. About 2½ minutes residence time of the casing in the bath is needed to allow absorption of the glutaraldehyde and salt into the casing. The break strength of the casing measured as it is withdrawn from this bath of glutaraldehyde and sodium chloride bath is about 1500–1600 g./in.$^2$ which is about 300–500 g./in.$^2$ higher than the casing of Example I at this stage.

The casing then is fixed by continuously passing it into another bath substantially saturated with sodium chloride and containing about 1% caustic soda for about 2½ minutes. The pH of this fixing bath is maintained at about 12 or higher. The strength of the casing after the fixing stage is about 1500–1600 g./in.$^2$. The sample then is washed with water for about 2½ minutes, reducing the pH of the casing to about 7 and removing the sodium chloride. The casing has a wet strength after washing of 1500–1600 g./in.$^2$ as compared to the 650–900 g./in.$^2$ break strength of the casing set forth in Example I. With the increased strength, the casing can be processed at a much faster speed than the casing of Example I.

Casings made by the above described method are uniform in diameter and wall thickness. The casing is formed of a smooth film which is substantially free of collagen fibers of macroscopic size. The casing film is translucent and apparently formed of collagen fibrils that are biaxially oriented. The casings prepared as described above could be shirred without difficulty using a shirring machine of the type used for regenerated cellulose casing.

EXAMPLE III

The preparation of edible collagen casings from limed animal hide by a typical prior art process is illustrated.

Fresh heifer hides were limed for a period of about 3 hours at 10° C. in a liming solution as in U.S. Pat. 3,408,918 and neutralized by treatment with dilute lactic acid and washed.

The limed and neutralized hide was defleshed and split as in Example I above. The corium split was cut into pieces, ground, swollen, homogenized, extruded and processed as in Example I. The tensile strengths at the various stage in processing were substantially the same as in Example I. The wet strength of the tanned and plasticized casing was about 650–900 g./in.$^2$.

EXAMPLE IV

The preparation of edible collagen casings from limed animal hide and tanned in accordance with this invention is illustrated.

A collagen slurry is prepared, extruded, and tanned in successive aluminum sulfate baths as in Example III. The subsequent tanning with aldehyde is in accordance with this invention.

The aluminum sulfate tanned casing having a wet breakload strength of 1200–1400 g./in.$^2$ is passed into an aqueous bath substantially saturated with sodium chloride at 25° C. and containing 0.1% glutaraldehyde plus 1% hydrochloric acid. The pH of this bath is 1.0 or slightly less. About 2½ minutes residence time of the casing in the bath is needed to allow absorption of the glutaraldehyde and salt into the casing. The break strength of the casing measured as it is withdrawn from this bath of glutaraldehyde and sodium chloride bath is from about 1500–1600 g./in.$^2$ or from about 300–500 g./in.$^2$ higher than the casing of Example III at this stage.

The casing then is fixed by continuously passing the casing into another bath substantially saturated with sodium chloride and containing about 1% caustic soda for about 2½ minutes. The pH of this fixing bath is maintained at about 12 or higher. The strength of the casing after the fixing stage is about 1500–1600 g./in.$^2$. The sample then is washed with water for about 2½ minutes, reducing the pH of the casing to about 7 and removing the sodium chloride. The casing has a wet strength after washing of about 1500–1600 g./in.$^2$ as compared to the 650–900 g./in.$^2$ break strength of the casing set forth in Example III. With the increased strength, the casing can be processed at a much faster speed than the casing of Example I.

Casings made by the above described method are uniform in diameter and wall thickness. The casing is formed of a smooth film which is substantially free of collagen fibers of macroscopic size. The casing film is translucent and apparently formed by collagen fibrils that are biaxially oriented. The casings prepared as described above could be shirred without difficulty using a shirring machine of the type used for regenerated cellulose casing.

EXAMPLE V

A collagen slurry is prepared in accordance with Example I and extruded into a coagulation bath consisting of a saturated solution of sodium sulfate in water.

The coagulated gel casing is then passed through a first tanning bath consisting of a saturated aqueous solution of sodium sulfate containing 0.2% glutaraldehyde acidified to pH 1.0 or less with 1% hydrochloric acid. The residence time in the first tanning bath is about 2–3 minutes.

The casing is next passed through a fixing bath for about 2–3 minutes. The fixing bath is a saturated solution of sodium sulfate in water rendered alkaline with 1.0% NaOH to a pH of 12.0 or higher. The fixing bath neutralizes the acid in the casing to effect a cross-linking of the collagen by the glutaraldehyde.

The casing passes from the fixing bath through one or more wash baths, a plasticizing bath, and is then dried and shirred. The wet tensile strength after tanning and after plasticizing is above 1200 g./in.$^2$.

EXAMPLE VI

A collagen slurry is prepared in accordance with Example III and extruded into a coagulation bath consisting of a saturated solution of sodium sulfate in water.

The coagulated gel casing is then passed through a first tanning bath consisting of a saturated aqueous solution of sodium sulfate containing 0.2% glutaraldehyde acidified to pH 1.0 or less with 1% hydrochloric acid. The residence time in the first tanning bath is about 2–3 minutes.

The casing is next passed through a fixing bath for about 2–3 minutes. The fixing bath is a saturated solution of sodium sulfate in water rendered alkaline with 1.0% NaOH to a pH of 12.0 or higher. The fixing bath neutralizes the acid in the casing to effect a cross-linking of the collagen by the glutaraldehyde.

The casing passes from the fixing bath through one or more wash baths, a plasticizing bath, and is then dried and shirred. The wet tensile strength after tanning and after plasticizing is above 1200 g./in.$^2$.

EXAMPLE VII

A collagen slurry is prepared in accordance with Example I and extruded into a coagulation bath consisting of a saturated solution of sodium sulfate in water.

The coagulated gel casing is then passed through a first tanning bath consisting of a saturated aqueous solution of sodium sulfate containing 0.2% formaldehyde acidified to pH 1.0 or less with 1% hydrochloric acid. The residence time in the first tanning bath is about 2–3 minutes.

The casing is next passed through a fixing bath for about 2–3 minutes. The fixing bath is a saturated solution of sodium sulfate in water rendered alkaline with 1.0% NaOH to a pH of 12.0 or higher. The fixing bath neutralizes the acid in the casing to effect a cross-linking of the collagen by the formaldehyde.

The casing passes from the fixing bath through one or more wash baths, a plasticizing bath, and is then dried and shirred. The wet tensile strength after tanning and after plasticizing is above 1200 g./in.$^2$.

EXAMPLE VIII

A collagen slurry is prepared in accordance with Example III and extruded into a coagulation bath consisting of a saturated solution of sodium sulfate in water.

The coagulated gel casing is then passed through a first tanning bath consisting of a saturated aqueous solution of sodium sulfate containing 0.2% formaldehyde acidified to pH 1.0 or less with 1% hydrochloric acid. The residence time in the first tanning bath is about 2–3 minutes.

The casing is next passed through a fixing bath for about 2–3 minutes. The fixing bath is a saturated solution of sodium sulfate in water rendered alkaline with 1.0% NaOH to a pH of 12.0 or higher. The fixing bath neutralizes the acid in the casing to effect a cross-linking of the collagen by the formaldehyde.

The casing passes from the fixing bath through one or more wash baths, a plasticizing bath, and is then dried and shirred. The wet tensile strength after tanning and after plasticizing is above 1200 g./in.$^2$.

EXAMPLE IX

A collagen slurry is prepared in accordance with Example I and extruded into a coagulation bath consisting of a saturated solution of sodium sulfate in water.

The coagulated gel casing is then passed through a first tanning bath consisting of a saturated aqueous solution of sodium sulfate containing 0.2% glyoxal acidified to pH 1.0 or less with 1% hydrochloric acid. The residence time in the first tanning bath is about 2–3 minutes.

The casing is next passed through a fixing bath for about 2–3 minutes. The fixing bath is a saturated solution of sodium sulfate in water rendered alkaline with 1.0% NaOH to a pH of 12.0 or higher. The fixing bath neutralizes the acid in the casing to effect a cross-linking of the collagen by the glyoxal.

The casing passes from the fixing bath through one or more wash baths, a plasticizing bath, and is then dried and shirred. The wet tensile strength after tanning and after plasticizing is above 1200 g./in.$^2$.

EXAMPLE X

A collagen slurry is prepared in accordance with Example III and extruded into a coagulation bath consisting of a saturated solution of sodium sulfate in water.

The coagulated gel casing is then passed through a first tanning bath consisting of a saturated aqueous solution of sodium sulfate containing 0.2% glyoxal acidified to pH 1.0 or less with 1% hydrochloric acid. The residence time in the first tanning bath is about 2–3 minutes.

The casing is next passed through a fixing bath for about 2–3 minutes. The fixing bath is a saturated solution of sodium sulfate in water rendered alkaline with 1.0% NaOH to a pH of 12.0 or higher. The fixing bath neutralizes the acid in the casing to effect a cross-linking of the collagen by the glyoxal.

In the treatment of casing in accordance with this invention, the two-step aldehyde treatment yields an uniformly higher strength and prevents the formation of aldehyde polymers in the casing which often result in an undesirable color. It is possible to get additional special effects in the casing by certain modifications of the fixing bath. The addition of 0.1–1.0% sodium bicarbonate, carbonate, or sesquicarbonate to the fixing bath will yield carbon dioxide bubbles which increases the porosity of the casing. Also, the incorporation of 0.1–0.5% sodium tripolyphosphate in the fixing bath will chelate iron (III) impurities in the slurry and the process baths. This will a substantially whiter casing.

What is claimed is:

1. In a process for producing an edible collagen casing wherein a collagen slurry is extruded as a casing, coagulated, tanned, and dried, the improvement for tanning the casing to provide improved wet strength prior to drying, which comprises:

(a) immersing the coagulated gel casing, substantially free of ammonia or ammonium salts, in a first tanning bath consisting of a substantially saturated aqueous solution of an alkali metal salt of a strong acid containing from about 0.01 to 5% aldehyde for tanning the casing, maintained at a temperature of from about 5 to 40° C., and having a pH of 3.0 or less, said immersion being for a time sufficient to effect absorption of a sufficient amount of salt and aldehyde to maintain the strength of the casing; and then, (b) immersing the casing into a second tanning bath consisting of a substantially saturated aqueous solution of an alkali metal salt of a strong acid, made basic with a strong alkali to a pH of at least 12, for a time sufficient to neutralize the acid in the casing and effect substantial crosslinking of the absorbed aldehyde into the casing, said second tanning bath being maintained at a temperature from about 5 to 40° C.

2. A process according to Claim 1 in which the alkali metal salt is a sodium or potassium salt of strong mineral acid.

3. A process according to Claim 1 in which the aldehyde is formaldehyde, glyoxal, or glutaraldehyde.

4. A process according to Claim 1 in which the casing is immersed in the first bath for a time sufficient to absorb the amount of aldehyde required to tan the casing with an uncombined residue of not more than 10 p.p.m. free aldehyde.

5. A process according to Claim 1 in which the casing is coagulated in a concentrated salt bath containing no ammonia or ammonium salt.

6. A process according to Claim 1 in which the casing is passed through a preliminary tanning bath of an iron or aluminum salt prior to immersion in said first tanning bath.

7. A process according to Claim 6 in which said iron or aluminum salt is rendered partially basic with sodium hydroxide and chelated with an organic acid.

References Cited
UNITED STATES PATENTS 3,425,847  2/1969  Talty _____ 99—176

HYMAN LORD, Primary Examiner

U.S. Cl. X.R.

426—140